(12) United States Patent
Den Boer

(10) Patent No.: US 12,478,037 B2
(45) Date of Patent: Nov. 25, 2025

(54) BALE RIPPER ASSEMBLY FOR FEED MIXER APPARATUS

(71) Applicant: Nolan Den Boer, Rock Valley, IA (US)

(72) Inventor: Nolan Den Boer, Rock Valley, IA (US)

(73) Assignee: Kooima Ag, Inc., Rock Valley, IA (US)

( * ) Notice: Subject to any disclaimer, the term of this patent is extended or adjusted under 35 U.S.C. 154(b) by 552 days.

(21) Appl. No.: 17/477,646

(22) Filed: Sep. 17, 2021

(65) Prior Publication Data

US 2023/0091209 A1 Mar. 23, 2023

(51) Int. Cl.
*A01K 5/00* (2006.01)
*A01F 29/06* (2006.01)
(Continued)

(52) U.S. Cl.
CPC .............. *A01K 5/004* (2013.01); *A01F 29/06* (2013.01); *B01F 27/172* (2022.01); *B01F 27/9212* (2022.01); *B01F 27/922* (2022.01); *B01F 33/5023* (2022.01); *B01F 33/8305* (2022.01); *B01F 33/83611* (2022.01)

(58) Field of Classification Search
CPC ....... A01K 5/004; A01K 5/00; B01F 27/9212; B01F 27/922; B01F 33/5023; B01F 33/8305; B01F 33/83611; B01F 27/172; A01F 29/06
USPC ....... 366/314, 307, 302, 306, 603, 318–324; 241/101.76, 101.761, 101.8, 260.1, 605
See application file for complete search history.

(56) References Cited

U.S. PATENT DOCUMENTS 1,408,850 A 3/1922 Webb
1,929,838 A 10/1933 Crane
(Continued)

FOREIGN PATENT DOCUMENTS

CA 2627001 A1 * 7/2008 ............. A01K 5/002
CA 3081080 A1 * 11/2020 ............ A01F 29/005
(Continued)

OTHER PUBLICATIONS

J. Arnold and R. Volz; "Laser Powder Technology for Cladding and Welding"; Journal of Thermal Spray Technology, pp. 243-248, vol. 8(2) Jun. 1999.
(Continued)

*Primary Examiner* — Charles Cooley
(74) *Attorney, Agent, or Firm* — Jeffrey A. Proehl; Woods Fuller Shultz & Smith PC

(57) ABSTRACT

A bale ripper assembly for pulling plant material from a bale may comprise a bale ripper device supportable on an auger of a feed mixer apparatus and having a first face and a second face with a perimeter. The perimeter may include a leading perimeter portion for orienting in a direction of movement of the device when the device is mounted on the auger of the mixer apparatus and the auger is rotated. The leading perimeter portion of the perimeter may include a plurality of sections with each section of the plurality of sections being oriented at an angle with respect to an adjacent said section of the leading perimeter portion. An outboard pair of the sections form an outboard tooth of the bale ripper device. The leading perimeter portion of the perimeter may have an edge face that extends between the first and second faces, and the edge face may be blunt.

18 Claims, 14 Drawing Sheets

(51) Int. Cl.
    *B01F 27/172*    (2022.01)
    *B01F 27/9212*    (2022.01)
    *B01F 27/922*    (2022.01)
    *B01F 33/502*    (2022.01)
    *B01F 33/80*    (2022.01)
    *B01F 33/83*    (2022.01)

(56) References Cited

U.S. PATENT DOCUMENTS

| | | | |
|---|---|---|---|
| 2,183,114 A | 12/1939 | Bonapace | |
| 2,867,137 A | 1/1959 | Joy | |
| 2,934,120 A | 4/1960 | Schnell | |
| 3,022,621 A | 2/1962 | Zavarella | |
| 3,635,271 A | 1/1972 | Markham | |
| 3,851,450 A | 12/1974 | Nelson | |
| 4,068,688 A | 1/1978 | Benson | |
| 4,198,006 A | 4/1980 | Rolfe | |
| 4,205,564 A | 6/1980 | Kolb | |
| 4,205,797 A | 6/1980 | Bennett, Jr. | |
| 4,357,817 A | 11/1982 | Linsinger | |
| 4,376,793 A | 3/1983 | Jackson | |
| 4,428,260 A | 1/1984 | Eby | |
| 4,506,839 A | 3/1985 | Black | |
| 4,563,867 A | 1/1986 | Bokon | |
| 4,615,734 A | 10/1986 | Spriggs | |
| 4,690,024 A | 9/1987 | Chaconas | |
| 4,719,743 A | 1/1988 | Bokon | |
| 4,724,299 A | 2/1988 | Hammeke | |
| 4,760,967 A | 8/1988 | Bendickson | |
| 4,770,253 A | 9/1988 | Hallissy | |
| 4,802,396 A | 2/1989 | Kuklinski | |
| 4,896,424 A | 1/1990 | Walker | |
| 5,020,918 A | 6/1991 | Faccia | |
| 5,027,592 A | 7/1991 | Wieneke | |
| 5,074,623 A | 12/1991 | Hedlund | |
| 5,082,188 A | 1/1992 | Urich | |
| 5,160,822 A | 11/1992 | Aleshin | |
| 5,193,280 A | 3/1993 | Jackson | |
| 5,331,876 A | 7/1994 | Hayden, Sr. | |
| 5,351,595 A | 10/1994 | Johnston | |
| 5,427,000 A | 6/1995 | Hellbergh | |
| 5,456,416 A | 10/1995 | Hartwig | |
| 5,553,937 A | 9/1996 | Faccia | |
| 5,590,963 A | 1/1997 | Schuler | |
| 5,601,362 A * | 2/1997 | Schuler | B01F 27/92 366/323 |
| 5,613,537 A | 3/1997 | Gassiott | |
| 5,615,839 A | 4/1997 | Hartwig | |
| 5,622,638 A | 4/1997 | Schell | |
| 5,647,665 A | 7/1997 | Schuler | |
| 5,772,131 A | 6/1998 | Dal Maso | |
| 5,823,449 A * | 10/1998 | Kooima | A01K 5/004 241/300 |
| 5,863,122 A * | 1/1999 | Tamminga | B01F 27/82 366/314 |
| 5,884,465 A | 3/1999 | Ibach | |
| 5,979,152 A | 11/1999 | McCredie | |
| 5,997,248 A | 12/1999 | Ghasripoor | |
| 6,000,649 A | 12/1999 | Loppoli | |
| 6,092,750 A | 7/2000 | Kooima | |
| 6,328,465 B1 * | 12/2001 | Tamminga | B01F 33/502 241/261.1 |
| 6,367,533 B1 | 4/2002 | Pitzen | |
| 6,510,681 B2 | 1/2003 | Yang | |
| 6,571,665 B2 | 6/2003 | Julien | |
| 6,662,837 B2 | 12/2003 | Smith | |
| 6,857,255 B1 | 2/2005 | Wilkey | |
| 7,043,819 B1 | 5/2006 | Arnold | |
| 7,104,883 B2 | 9/2006 | Dow | |
| 7,124,567 B1 | 10/2006 | Adamson | |
| 7,290,341 B2 | 11/2007 | Kooima | |
| 7,537,419 B2 | 5/2009 | Sjoberg | |
| 7,543,387 B2 | 6/2009 | Legrand | |
| 7,644,568 B2 | 1/2010 | Buchko | |
| 7,703,713 B2 | 4/2010 | Smith | |
| 8,109,176 B1 | 2/2012 | Kooima | |
| 8,186,611 B1 * | 5/2012 | Boer | A01K 5/001 241/294 |
| 8,646,715 B2 | 2/2014 | Pellman | |
| 9,751,055 B2 * | 9/2017 | Tamminga | B01F 27/922 |
| 10,462,963 B2 * | 11/2019 | Stoffel | B01F 27/172 |
| 10,772,290 B2 * | 9/2020 | Repka | B01F 27/1143 |
| 11,044,852 B2 * | 6/2021 | Kooima | B02C 18/18 |
| 11,122,771 B2 * | 9/2021 | Pastoor | B01F 27/172 |
| 2006/0242845 A1 | 11/2006 | Kooima | |
| 2007/0039445 A1 | 2/2007 | Nitsch | |
| 2007/0261867 A1 | 11/2007 | Techel | |
| 2010/0071216 A1 | 3/2010 | Novak | |
| 2010/0108794 A1 | 5/2010 | Tamminga | |
| 2010/0325902 A1 | 12/2010 | Dutta | |
| 2012/0325950 A1 | 12/2012 | Davis | |
| 2014/0217222 A1 | 8/2014 | Greve | |
| 2016/0157423 A1 * | 6/2016 | Stoffel | A01D 34/73 219/76.1 |
| 2016/0309648 A1 | 10/2016 | Stoffel | |
| 2020/0009517 A1 * | 1/2020 | Repka | A01K 5/004 |
| 2020/0030758 A1 * | 1/2020 | Desrochers | B01F 27/808 |
| 2020/0368752 A1 * | 11/2020 | Kooima | B02C 18/18 |
| 2023/0049686 A1 * | 2/2023 | Tamminga | B01F 27/921 |
| 2023/0091209 A1 * | 3/2023 | Den Boer | B01F 33/8305 366/314 |
| 2023/0404026 A1 * | 12/2023 | Den Boer | A01K 5/001 |
| 2025/0134061 A1 * | 5/2025 | Zagaeski | A01K 5/004 |

FOREIGN PATENT DOCUMENTS

| | | | | |
|---|---|---|---|---|
| DE | 202012005858 U1 * | 8/2013 | | A01K 5/001 |
| EP | 1417999 A2 * | 5/2004 | | A01K 5/004 |
| EP | 1864571 A1 * | 12/2007 | | A01K 5/004 |
| EP | 2327297 A1 * | 6/2011 | | A01K 5/004 |
| EP | 4573893 A1 * | 6/2025 | | A23N 17/007 |
| FR | 3023493 A1 * | 1/2016 | | A01K 5/004 |
| WO | WO-2011061174 A1 * | 5/2011 | | A01K 5/004 |
| WO | 2018035611 | 3/2018 | | |
| WO | WO-2022158973 A1 * | 7/2022 | | A01K 5/004 |

OTHER PUBLICATIONS

Steffen Nowotny et al., "Laser Beam Build-Up Welding: Precision in Repair, Surface Cladding, and Direct 3D Metal Deposition"; Journal of Thermal Spray Technology, pp. 344-348, vol. 16(3) Sep. 2007.

E. Schubert et al.; "Laser Beam Cladding: A Flexible Tool for Local Surface Treatment and Repair"; Journal of Thermal Spray Technology, pp. 590-596, vol. 8(4) Dec. 1999.

M. Lugbauer et al., "Thermal Sprayed Coatings in High-Performance Agricultural Machinery: Properties and Wear-Behaviour Test Routine", Proceedings of the 2006 International Spray Conference, pp. 1345-1350, May 2006.

Standard Mixer Knife, Kooima Company Product Catalog, download date Feb. 16, 2010, www.kooima.com.

Knife Backing Plate, Kooima Company Product Catalog, download date Feb. 16, 2010, www.kooima.com.

Kuhn North America, VSL Vertical Maxx Single-Auger TMR Mixers, brochure, copyright 2009.

* cited by examiner

BALE RIPPER ASSEMBLY FOR FEED MIXER APPARATUS

BACKGROUND

Field

The present disclosure relates to livestock feed mixing apparatus and more particularly pertains to a new bale ripper assembly for feed mixer apparatus for enhancing the efficiency in which baled plant material is processed by the mixer apparatus.

SUMMARY

In one aspect, the present disclosure relates to a bale ripper assembly for pulling plant material from a bale at least partially positioned in a tub of a feed mixer apparatus. The bale ripper assembly may comprise a bale ripper device which is supportable on a rotatable auger of the feed mixer apparatus. The bale ripper device may have a first face and a second face and a perimeter, and the perimeter may include a leading perimeter portion for orienting in a direction of movement of the device when the device is mounted on the auger and the auger is rotating. The leading perimeter portion of the perimeter may include a plurality of sections, with each section of the plurality of sections being oriented at an angle with respect to an adjacent section of the leading perimeter portion. An outboard pair of the sections may form an outboard tooth of the bale ripper device. The leading perimeter portion of the perimeter may have an edge face extending between the first and second faces, and the edge face may be blunt.

In another aspect, the disclosure relates to a system that comprises an agricultural feed mixer apparatus configured to mix ingredients for animal feed including a fibrous plant material bound in a bale. The mixer apparatus may include a frame, and a tub mounted on the frame and defining an interior for holding the ingredients of the feed to be mixed, with the tub having a lower floor and an upper opening. The mixer apparatus may further include an auger positioned in the interior of the tub, and the auger may extend upwardly in the interior. The auger may comprise a central mast rotatably mounted on the frame and extending upwardly in the interior of the tub and flighting mounted on the central mast to rotate with the mast. The flighting may have a helical configuration extending about the central mast, and the flighting may further have an upper end toward the upper opening of the tub and a lower end toward the floor of the tub. The flighting has an outer edge and an uppermost circumvolution extending from the upper end of the flighting. The mixer apparatus may also include at least one knife configured to cut ingredients of the feed located in the interior of the tub, and may be mounted on the flighting of the auger to be moved in the interior of the tub by rotation of the auger for contacting the feed in the interior. The at least one knife may have a forward edge with a sharpened edge. The system may also comprise a bale ripper assembly for pulling plant material from a bale at least partially positioned in the tub of the feed mixer apparatus, and the bale ripper assembly may comprise a bale ripper device supported on the uppermost circumvolution of the auger. The bale ripper device may have a first face and a second face, and a perimeter. The perimeter may include a leading perimeter portion for orienting in a direction of movement of the device when the auger is rotated for mixing, and the leading perimeter portion of the perimeter may include a plurality of sections. Each section of the plurality of sections may be oriented at an angle with respect to an adjacent said section of the leading perimeter portion, and an outboard pair of said sections may form an outboard tooth of the bale ripper device. The leading perimeter portion of the perimeter may have an edge face extending between the first and second faces, and the edge face may be blunt.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
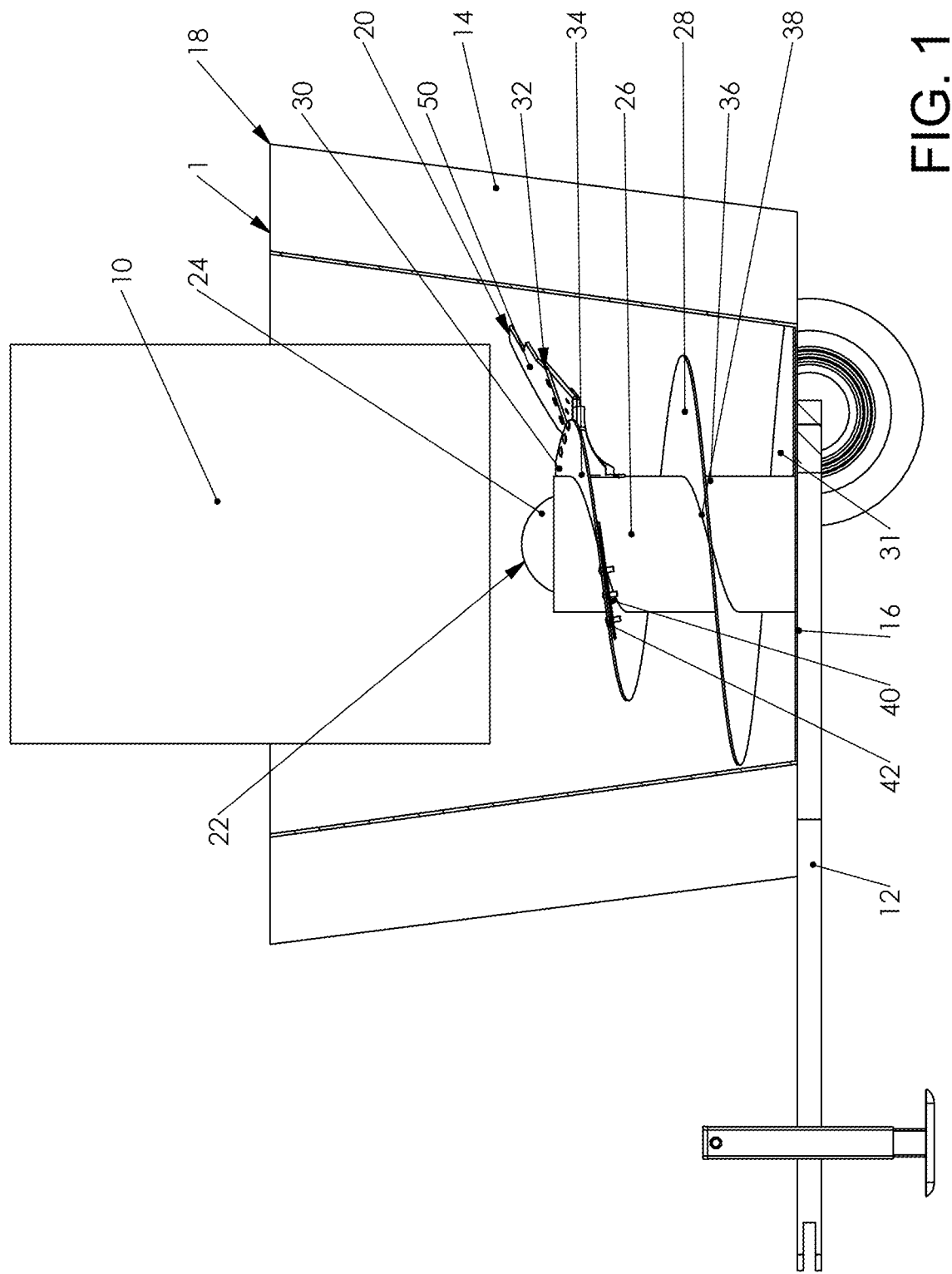
FIG. 1 is a schematic side view of a portion of an embodiment of a system with a new bale ripper assembly and feed mixer apparatus according to the present disclosure, with a portion of the tub of the feed mixer removed to reveal detail of the system and a bale shown entering the tub.
Figure 2:
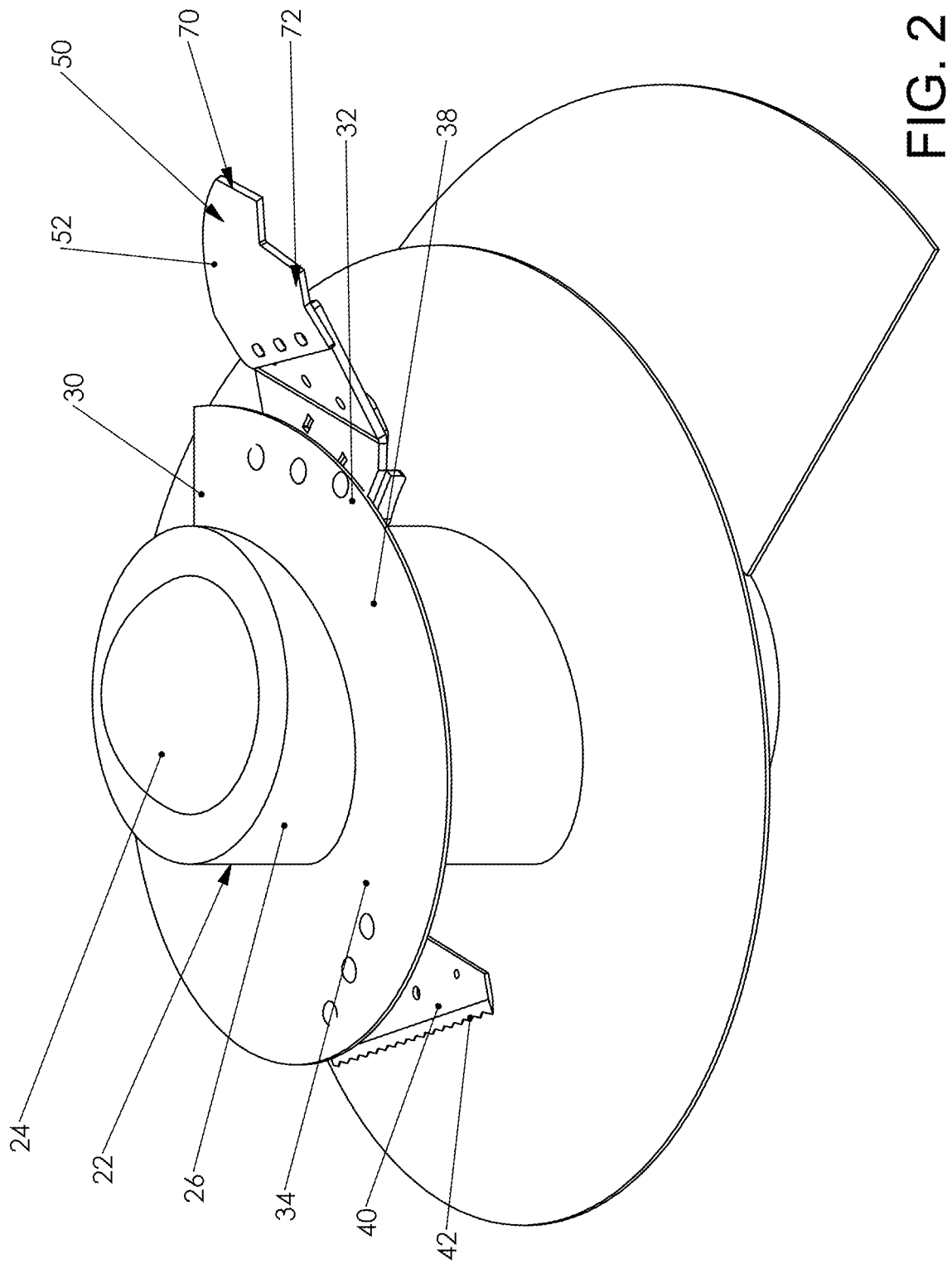
FIG. 2 is a schematic perspective view of an auger of the feed mixing apparatus with the bale ripper assembly mounted thereon and isolated from the remainder of the mixing apparatus, according to an illustrative embodiment.
Figure 3:
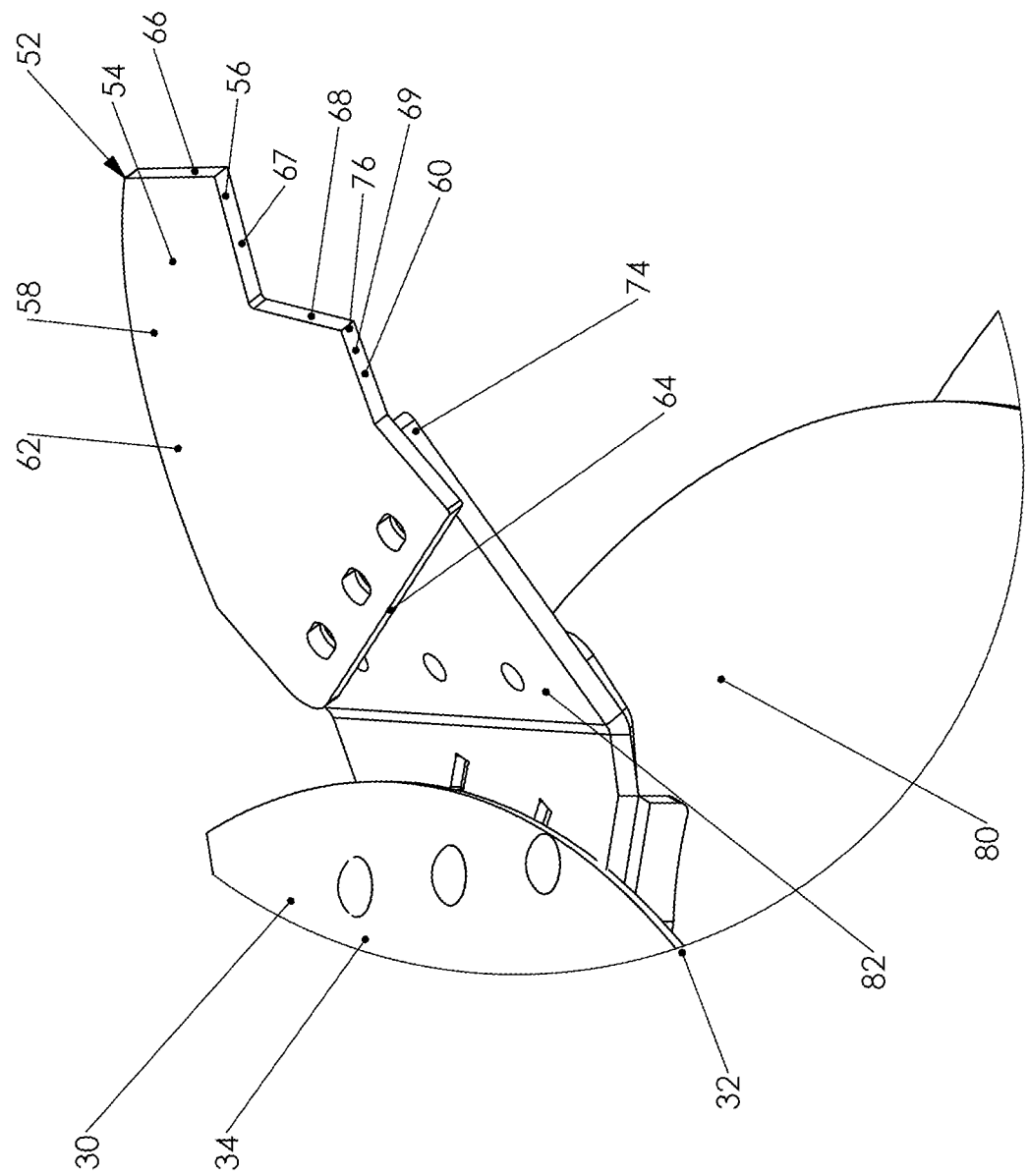
FIG. 3 is a schematic perspective view of the bale ripper device and ripper support device of the bale ripper assembly shown mounted on a fragmentary portion of the flighting of the auger, according to an illustrative embodiment.
Figure 4:
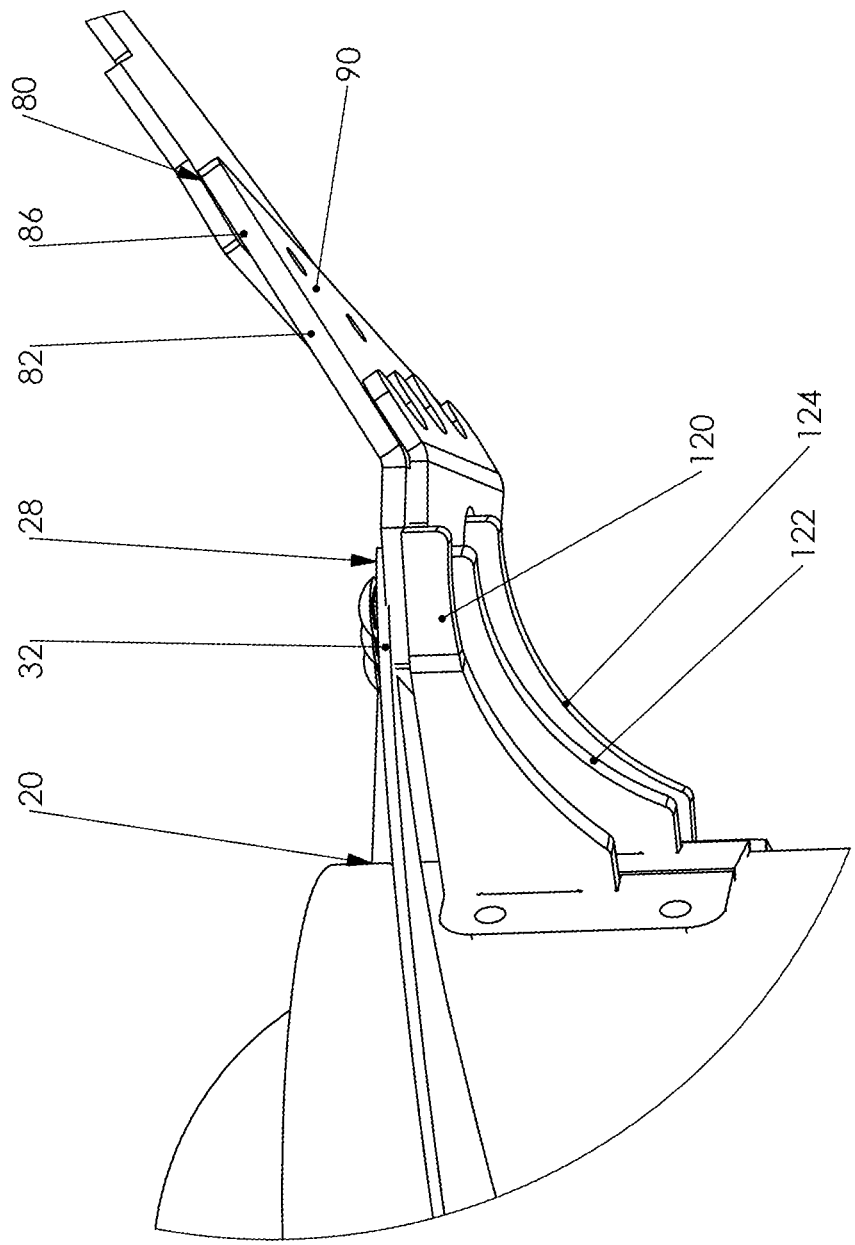
FIG. 4 is a schematic side view of the bale ripper device and the ripper support device of the bale ripper assembly shown mounted on a fragmentary portion of the flighting of the auger, according to an illustrative embodiment.
Figure 5:
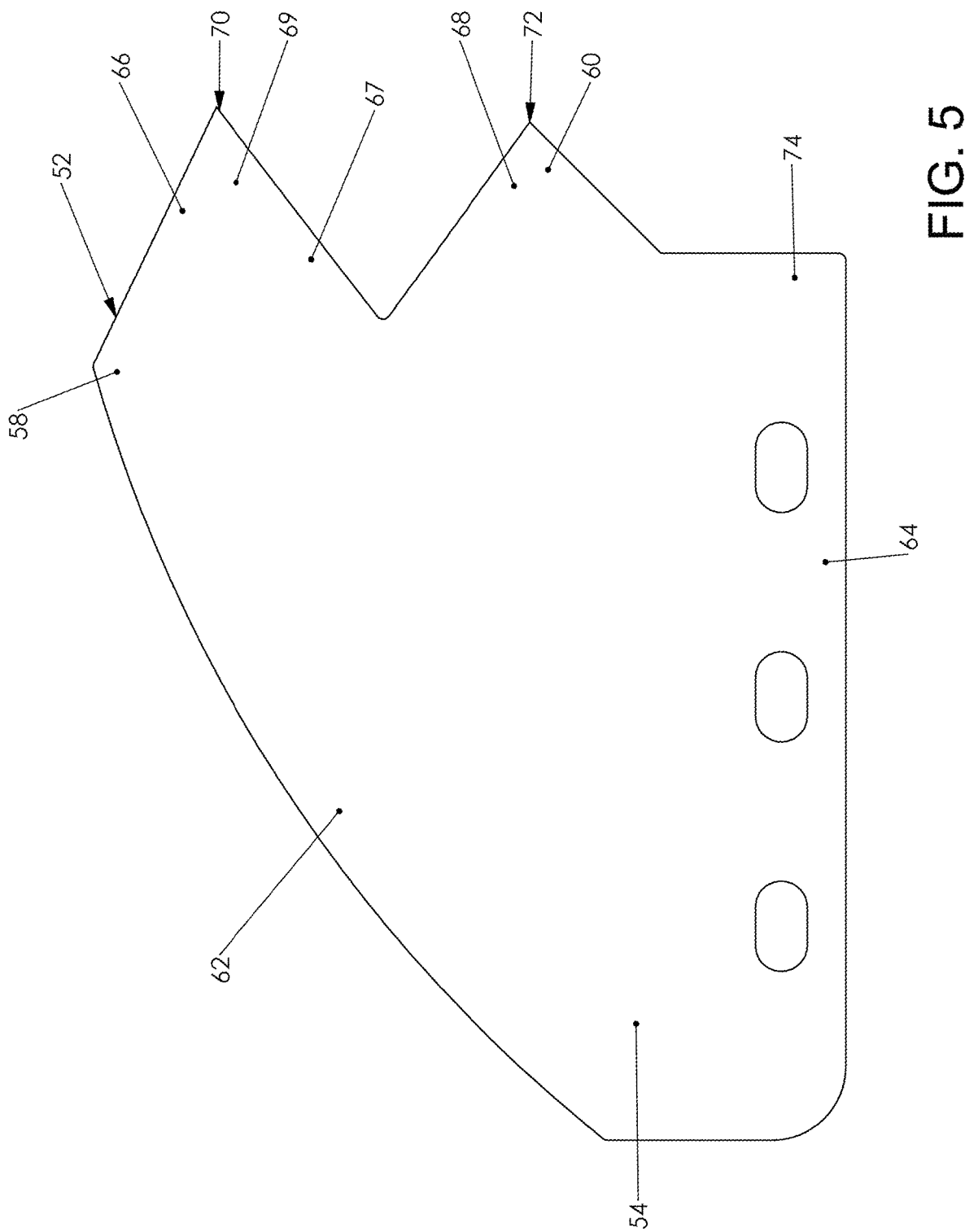
FIG. 5 is a schematic top view of an embodiment of the bale ripper device of the bale ripper assembly that is typically used with a bale support device, according to an illustrative embodiment.
Figure 6:
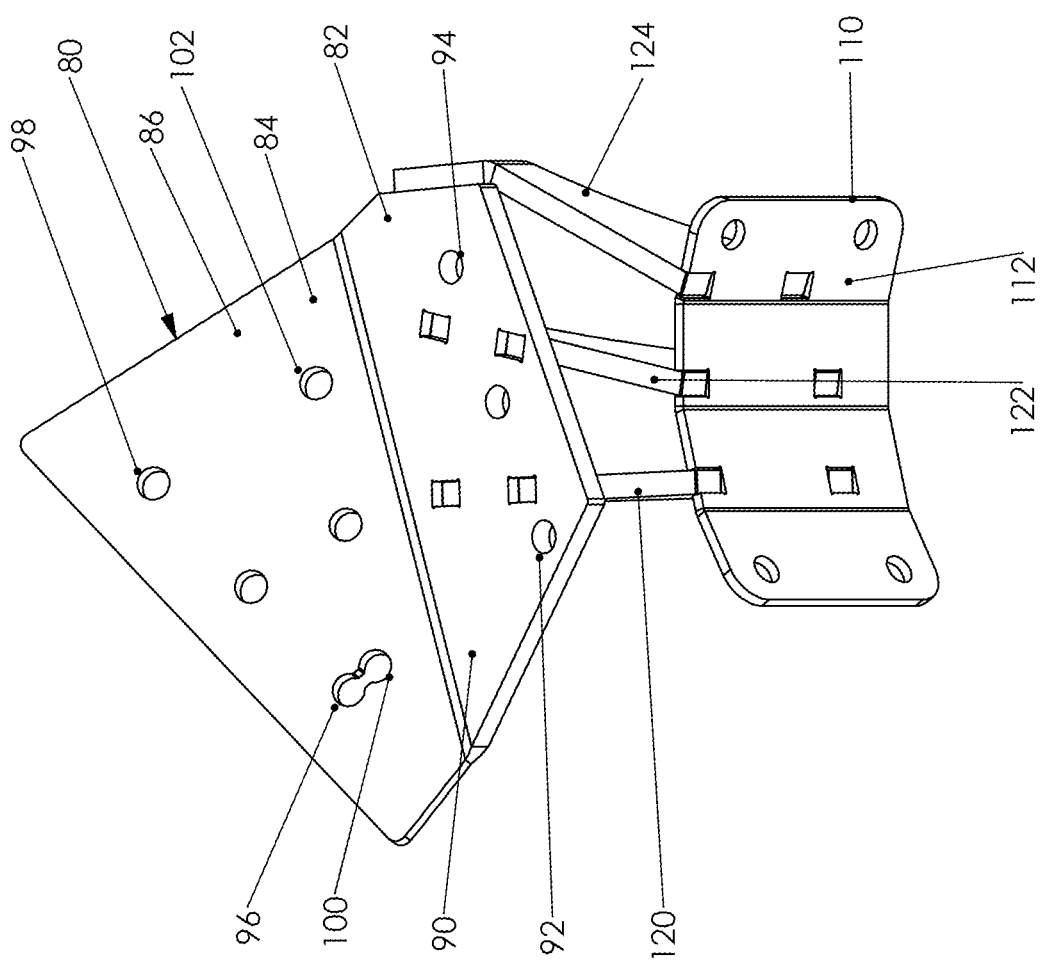
FIG. 6 is a schematic top view of the ripper support device of the bale ripper assembly useful with a bale ripper device, according to an illustrative embodiment.
Figure 7:
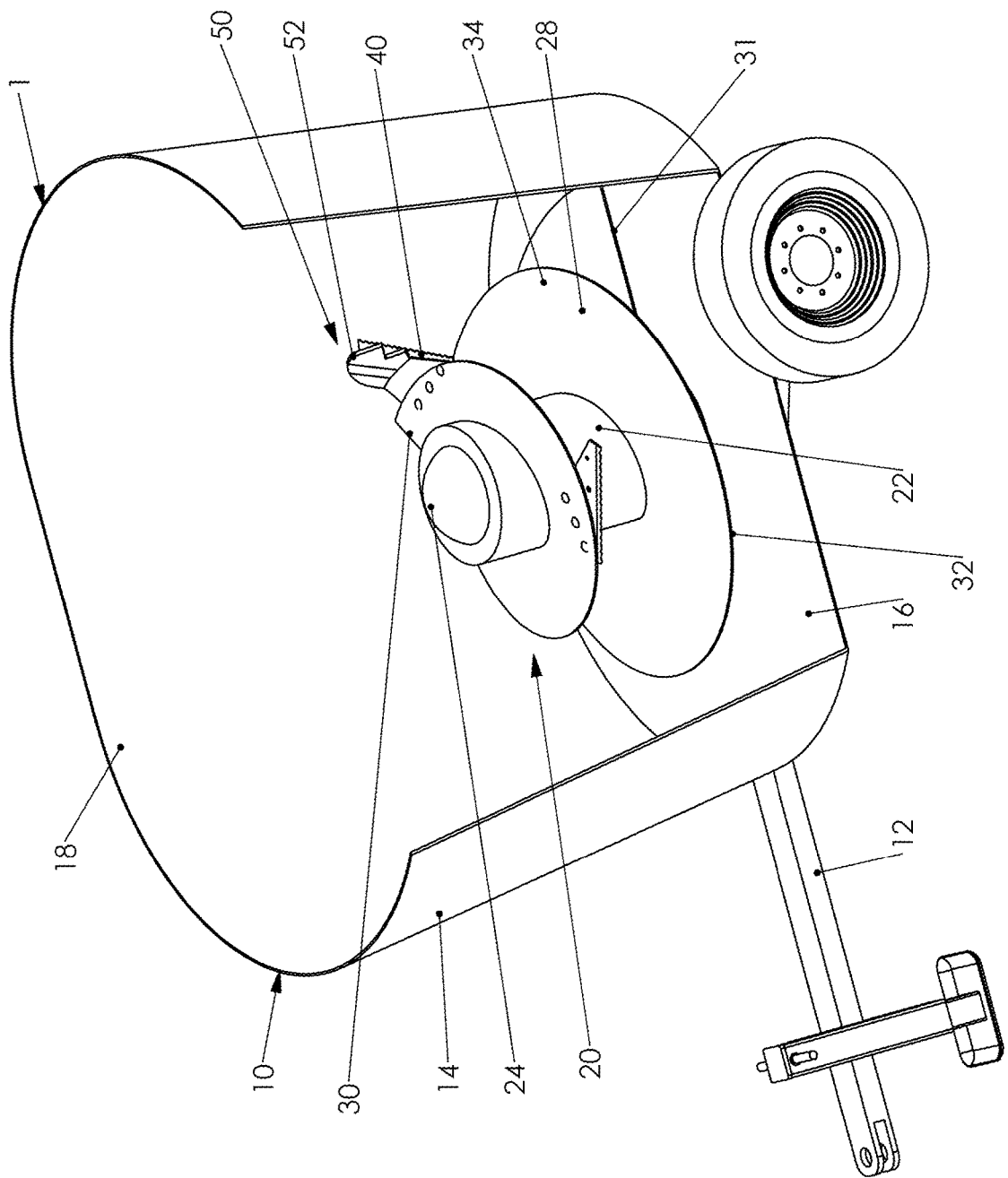
FIG. 7 is a schematic perspective view of another embodiment of a system with a new bale ripper device and feed mixer apparatus according to the present disclosure, with the bale ripper device being mounted on the auger of the mixer apparatus with a knife and having a portion of the tub of the mixer removed to reveal detail of the system.
Figure 8:
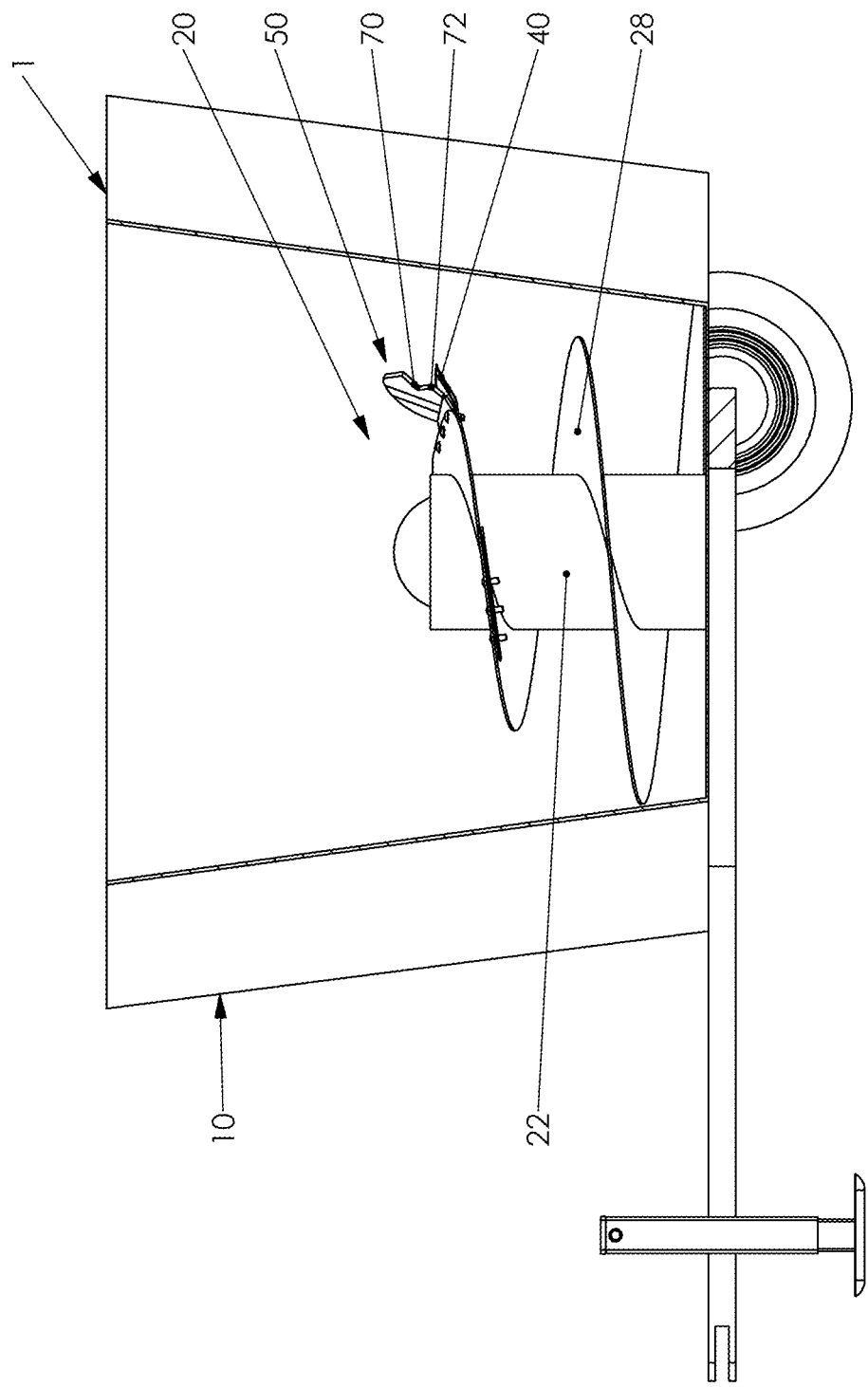
FIG. 8 is a schematic side view of the embodiment of the system in FIG. 7 with a portion of the tub of the feed mixer removed to reveal detail of the system.
Figure 9:
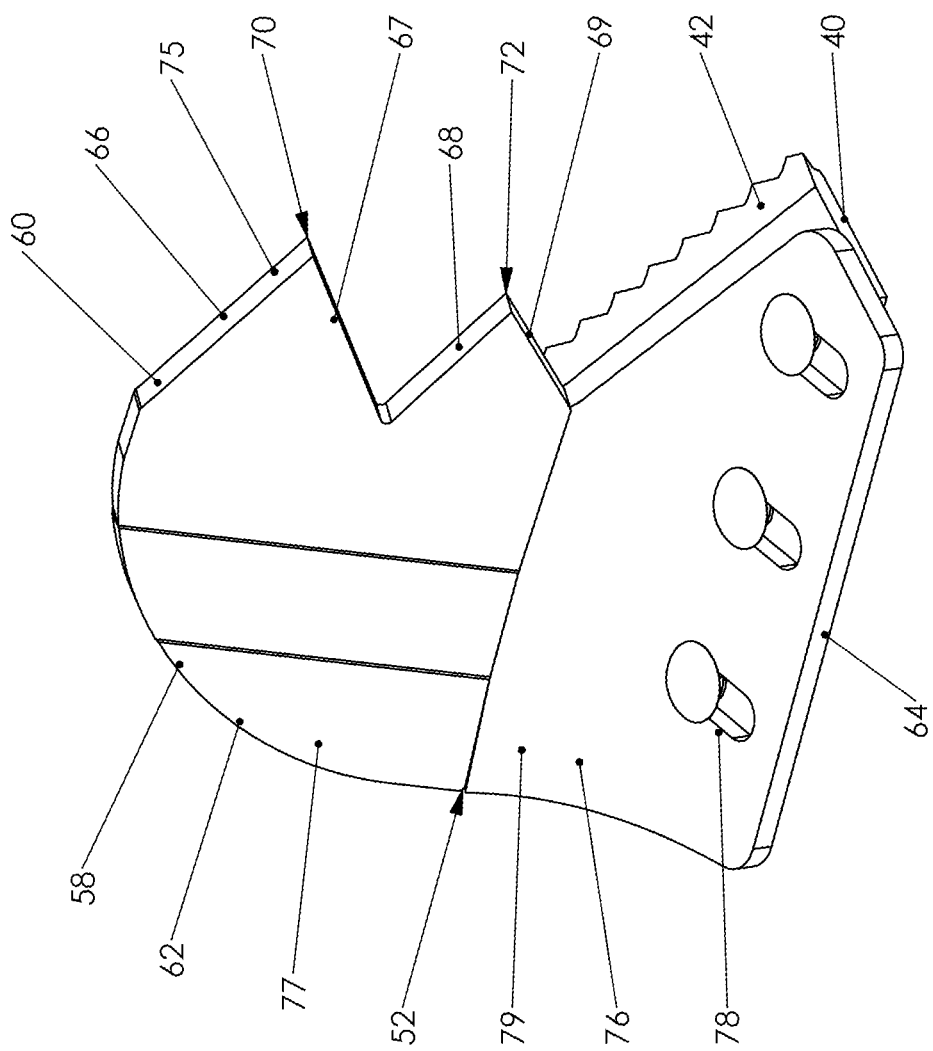
FIG. 9 is a schematic perspective view of a bale ripper device with a knife for mounting on an auger of a mixer apparatus such as is shown in FIG. 7, according to an illustrative embodiment.
Figure 10:
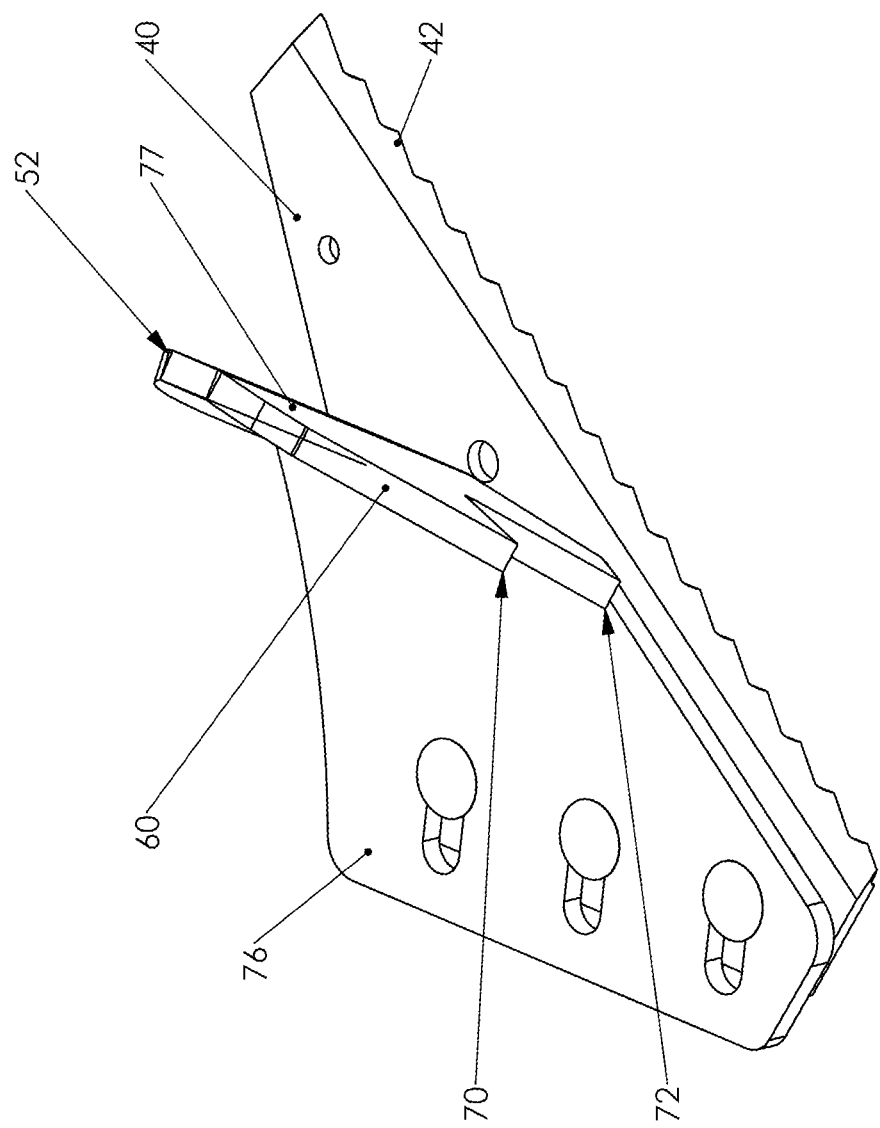
FIG. 10 is a schematic second perspective view of the bale ripper device with the knife for mounting on the auger of the mixer apparatus, according to an illustrative embodiment.
Figure 11:
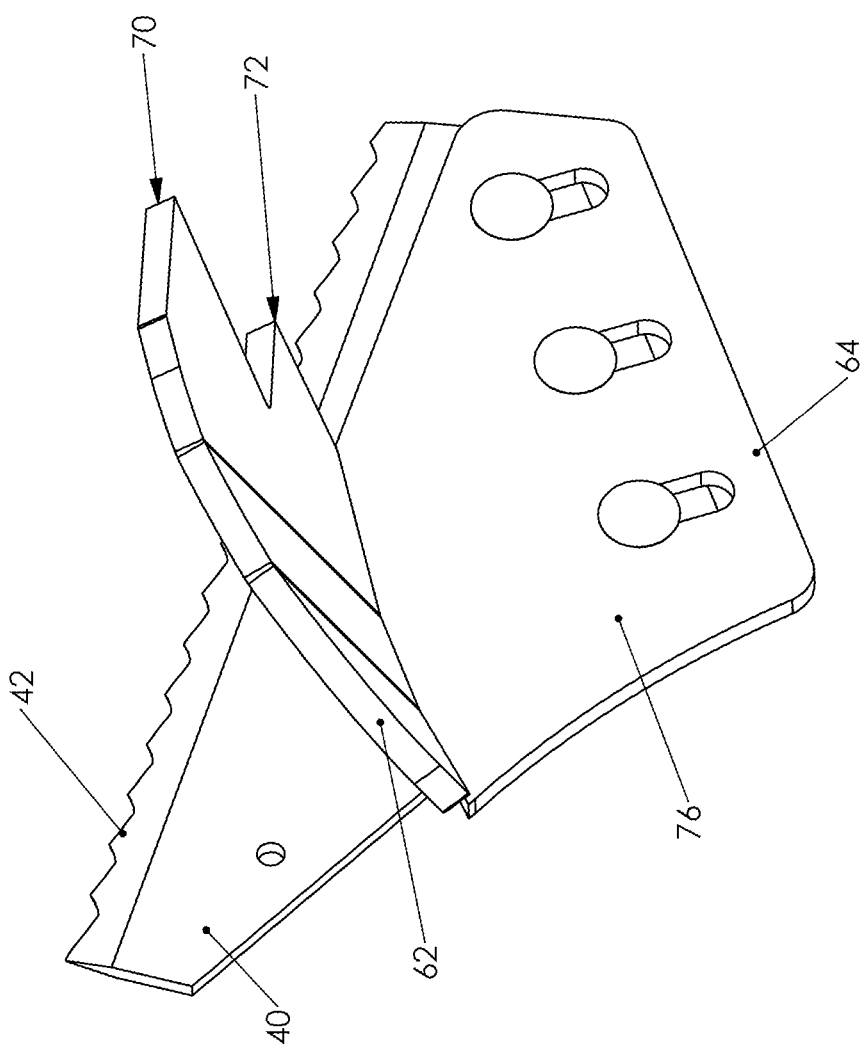
FIG. 11 is a schematic third perspective view of the bale ripper device with the knife for mounting on the auger of the mixer apparatus, according to an illustrative embodiment.
Figure 12:
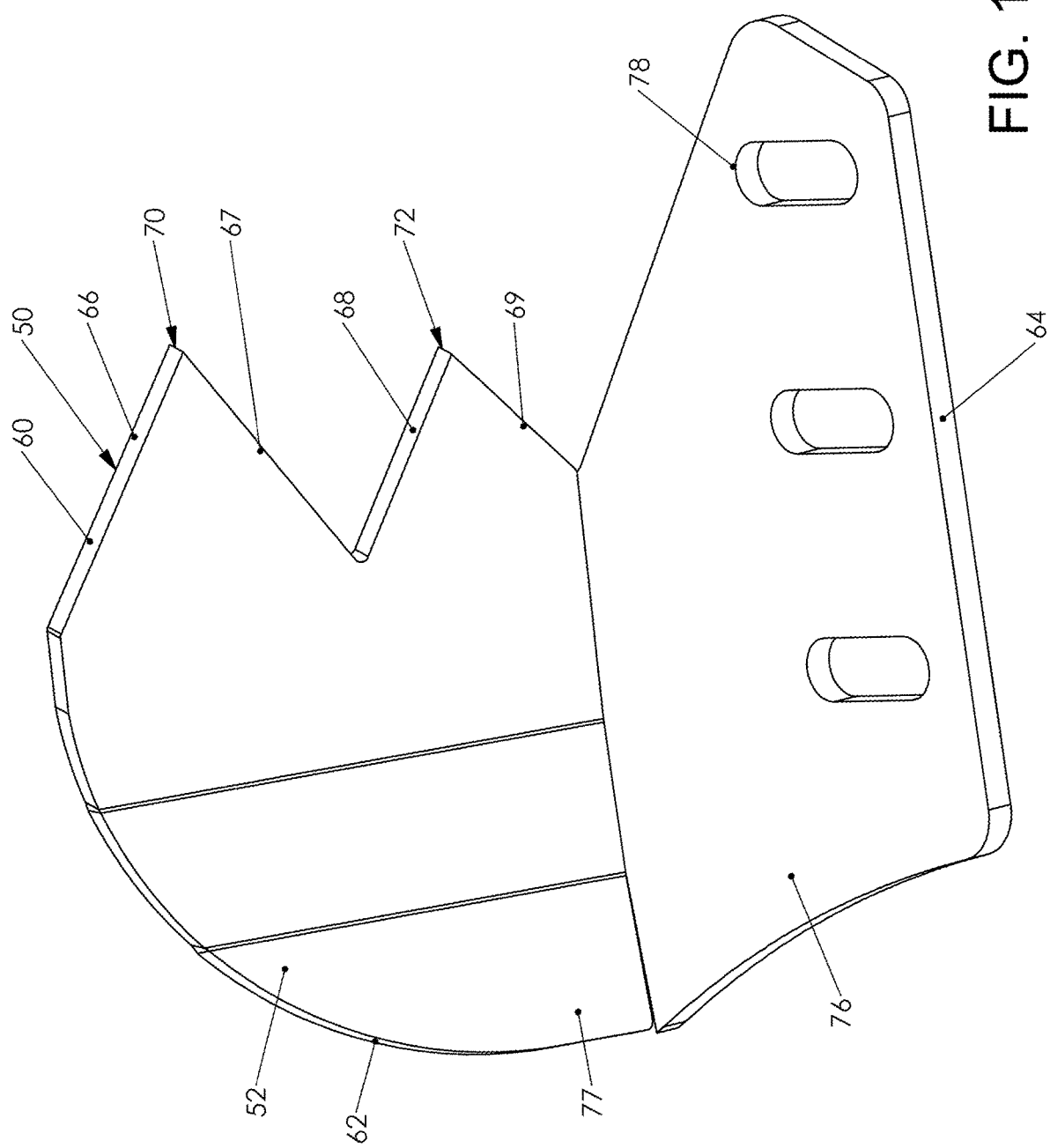
FIG. 12 is a schematic perspective view of the bale ripper device of FIG. 7 for mounting on the auger of the mixer apparatus, according to an illustrative embodiment.
Figure 13:
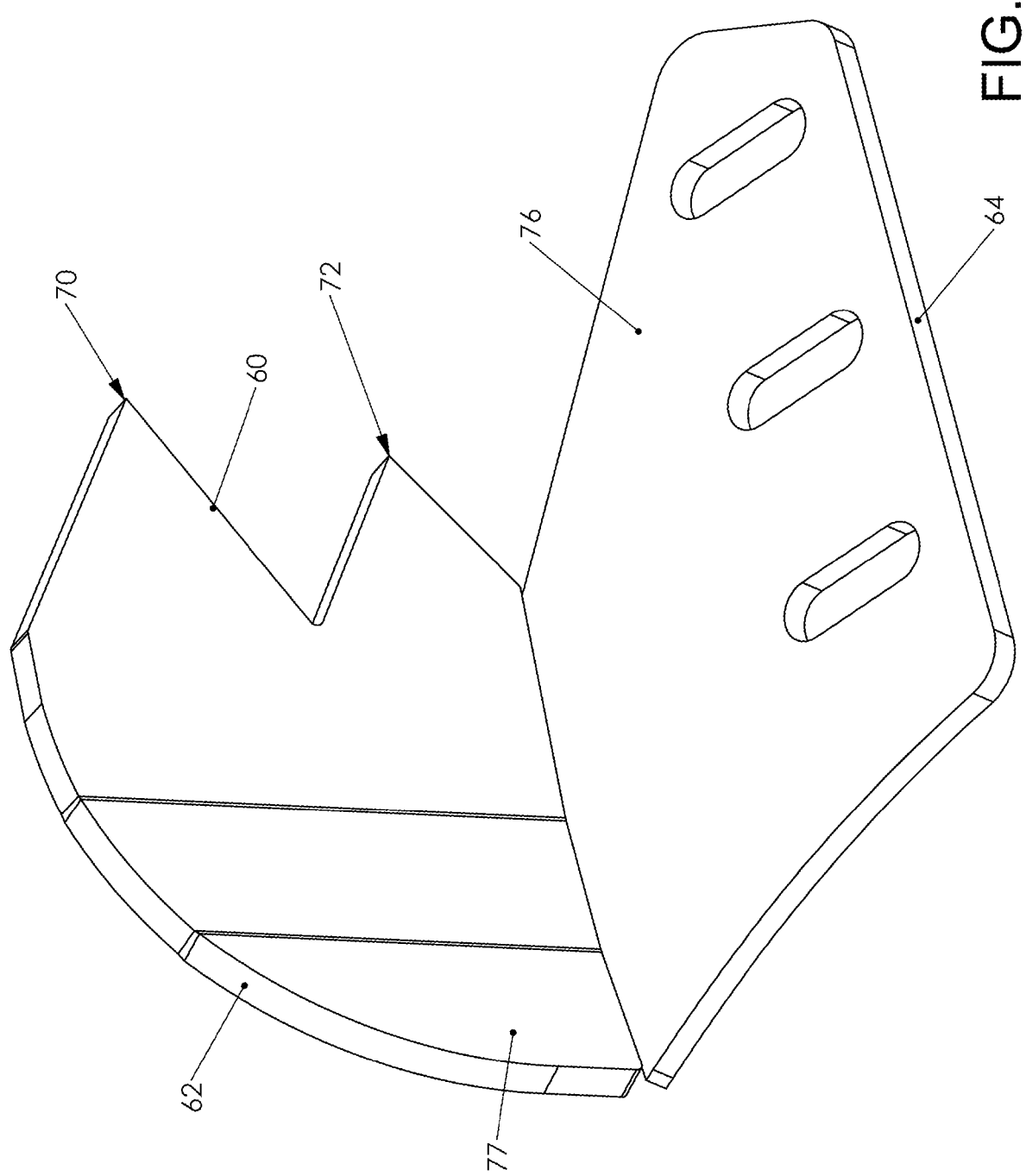
FIG. 13 is a schematic second perspective view of the bale ripper device of FIG. 7 for mounting on the auger of the mixer apparatus, according to an illustrative embodiment.
Figure 14:
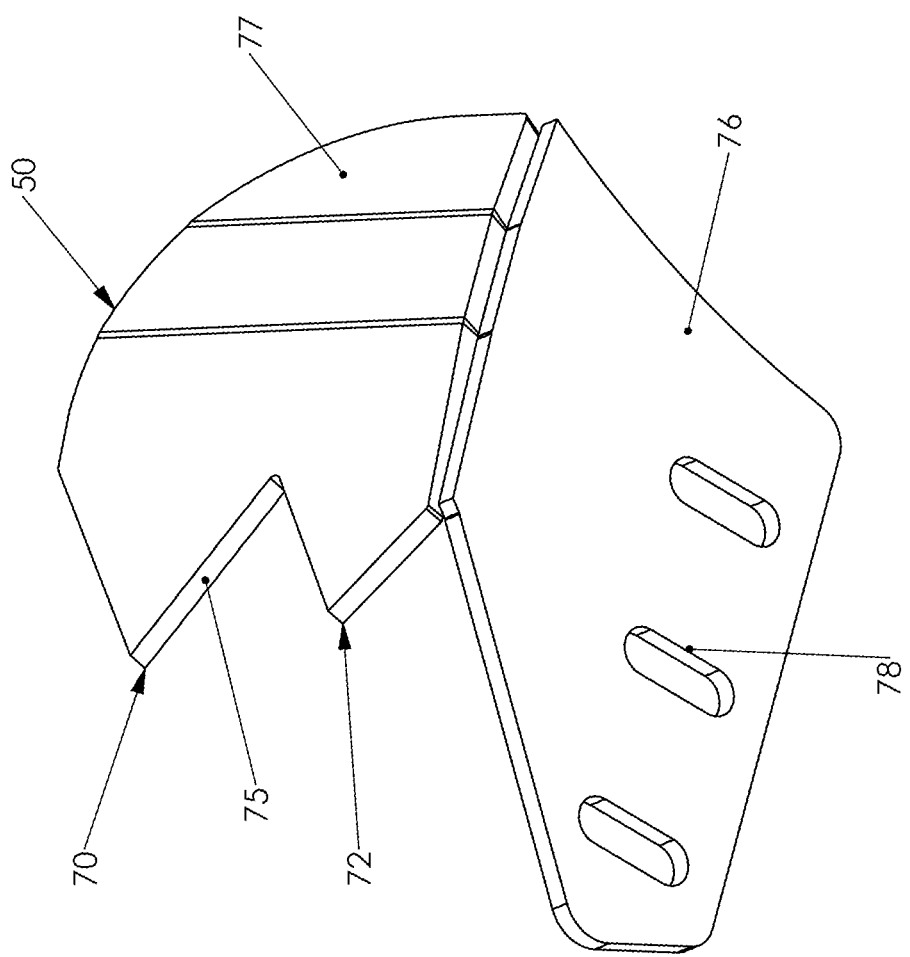
FIG. 14 is a schematic third perspective view of the bale ripper device of FIG. 7 for mounting on the auger of the mixer apparatus, according to an illustrative embodiment.

With reference now to the drawings, and in particular to FIGS. 1 through 14 thereof, a new bale ripper assembly for feed mixer apparatus embodying the principles and concepts of the disclosed subject matter will be described.

Farmers often utilize a feed mixing apparatus, such as a vertical feed mixer apparatus, to chop up and intermix ingredients for feed to be fed to livestock animals. While the feed may include a variety of supplements and additives, usually a significant proportion of the ingredients for the feed is comprised of plant material, such as hay. The plant material is typically available in a baled form, and often in the form of a large round bale having dimensions of approximately 4 feet wide by 4 feet in diameter, at a minimum. Ideally, the bale would be broken up to a large degree prior to the plant material being introduced into the interior of the mixer apparatus so that the plant material is detached into small clumps and ready to mix with other ingredients when it enters the mixer apparatus.

The applicants have recognized, however, that quite often large chunks of plant material from a bale, or even an entire bale, is dumped or dropped into the upper opening of the vertical feed mixer apparatus with the intention that the auger of the mixer apparatus contact and break up the bale. Such an approach can greatly increase the time necessary for the mixing operation as the auger of the mixer apparatus must first break up the baled material before any effective mixing can be accomplished. However, the auger of the mixer apparatus is primarily designed to move the contents of the interior of the mixer apparatus about the interior to thereby intermix the ingredients, and consequently the auger is not efficient for ripping the plant material of the bale apart. In particular, the auger typically has a continuous and smooth outer edge that is not well-suited to penetrating a bale and pulling the intermingled plant material from the bale.

The auger of a mixer apparatus is often provided with multiple knives mounted at spaced locations along the outer edge of the auger to cut the contents of the tub of the mixer apparatus, particularly plant material, into smaller pieces. While the knives tend to be more effective at penetrating the bale, the nature of the knives is to cut and quite often the knife will simply cut through the plant material in the bale and largely leave the cut plant material intact in the bale. Moreover, the positioning of the knives on the auger may result in only one, or perhaps two, of the knives actually contact the baled plant material, quite a few auger rotations may be required to accomplish the break up of the baled material. As the rotational speed of the auger is relatively slow, it can take an extended period of time for a sufficient number of passes of the knife or knives past the bale to occur to break down the bale and permit intermixing with other ingredients.

Vertical feed mixer apparatus may have one, two, or even three augers, and single auger vertical mixers are particularly inefficient at breaking up bales. With multiple augers, bales placed in the mixer tub may fall between counter rotating augers and have two moving surfaces contacting and working on the plant material the bale, whereas with a single auger, it is not uncommon for the bale to be slid along the top edge of the tub of the mixer apparatus by the rotating auger without significant resistance to tear up the bale.

The applicants have recognized that neither the auger itself, nor knives positioned along the outer edge of the auger, are sufficiently effective to break down a bale of plant material in an efficient manner. The applicants have developed a bale ripper assembly which may be utilized with the auger of the vertical mixer to enhance the effectiveness of the auger in breaking down a bale by ripping plant material from the bale without simply cutting through the baled plant material. One advantageous aspect of the disclosure is the utilization of relatively blunt surfaces or edges to engage and pull on the plant material without causing a significant incidence of cutting the plant material. The breakdown of the bale is conducted in a more efficient manner as clumps of the baled plant material are more quickly pulled off of the bale and dropped into the other ingredients in the interior of the tub of the mixer apparatus to be acted upon by larger portions of the auger and greater numbers of the knives. The bale ripper assembly may include a ripper device that is inefficient in cutting baled plant material, relative to knives utilized on the auger of mixer apparatus.

Further, in aspects of the disclosure, positioning of the bale ripper assembly may be adjustable so that the ripper device extends further or closer to the auger, and the ripper device may be oriented upwardly with respect to the auger as compared to the auger flighting as well as knives mounted on the auger, to more efficiently break up the plant material of the bale.

In some aspects, the disclosure relates to a system 1 that may include a combination of an agricultural mixer apparatus 10 configured to mix ingredients for animal feed and a bale ripper assembly 50 mounted on the mixer apparatus to enhance the ability of the mixer apparatus to configured to remove clumps of plant material from a bale introduced into the mixer apparatus. Other aspects of the disclosure include the bale ripper apparatus apart from the mixer apparatus.

The agricultural mixer apparatus 10 may be configured to cut up or sever pieces of the ingredients of the feed, in addition to mixing the ingredients, to enhance consumability and digestibility of the mixed ingredients of the feed by an animal. The ingredients may include fibrous plant material, which may be introduced to the apparatus 10 in a baled form, without the fibers of the plant material having been actively separated from each other from the generally interwoven condition of the bale.

In greater detail, the agricultural mixer apparatus 10 may comprise a vertical feed mixer apparatus in which material to be mixer is introduced through the top of the apparatus and the mixing elements generally rotate about a vertical axis. The mixer apparatus 10 may include a frame 12, and the frame may be configured to move across a ground surface for portability. In some embodiments, portability of the frame, and other elements of the apparatus, may be accomplished by the frame being part of a trailer for towing behind a towing vehicle as a trailer. Other embodiments may have the frame 12 as an element of a motorized vehicle for more permanent mounting of the apparatus on the vehicle. The apparatus 10 may be provided with one or more axles mounted on the frame 12, and wheels may be mounted on opposite ends of the axle or axles. The mixer apparatus 10 may further include a tub 14 for holding the ingredients of the feed prior to and during mixing of the ingredients. The tub 14 may be mounted on the frame 12, and may define an interior 15 for receiving the ingredients prior to and/or during the mixing operation. The interior 15 may be bounded by a floor 16 at a lower portion of the interior, and the interior 15 may be accessed through an opening 18 at an upper portion of the interior. In some embodiments, a horizontal cross-sectional area of the interior 15 may increase toward the opening 18 and decrease toward the floor 16.

The mixer apparatus 10 may further include an auger 20 which is positioned in the interior 15 of the tub, and may extend upwardly from the floor 16 of the tub toward the opening 18 of the tub. The auger 20 may be rotatably mounted on the frame 12 to rotate with respect to the tub by, for example, a drive system including an onboard power source or by a power take off assembly linkable to another apparatus such as a tractor.

The auger 20 may comprise a central mast 22 rotatably mounted on the frame 12. The central mast 22 extends upwardly from the floor 16 of the tub toward the opening 18 and terminates at an upper tip 24. The central mast 22 has a peripheral surface 26 which may be generally cylindrical in shape. The auger 20 may also comprise flighting 28 mounted on the central mast 22 such that the flighting rotates with the mast. The flighting 28 may have a helical configuration which extends about the central mast 22, and has an upper end 30 and a lower end 31. The upper end 30 may be located toward the opening 18 of the tub and the lower portion 31 may be located toward the floor 16 of the tub. The flighting 28 may have an outer edge 32 which may extend helically from the upper end 30 to the lower end 31 along a helical path. The flighting 28 may have an upper surface 34 which is oriented generally in an upward direction and a lower surface 36 which is oriented generally in a downward direction. The flighting 28 has an uppermost circumvolution 38 located toward the upper tip 24 of the central mast and extends from the upper end 30 of the flighting toward the lower end 31. Typically, the flighting 28 is provided with a plurality of mounting locations spaced along the outer edge 32 for mounting material cutting implements such as knives. Each of the mounting locations may be provided with one or more apertures through the flighting for receiving fasteners to fasten the cutting implements to the flighting.

The mixer apparatus 10 may also include at least one knife 40 which is configured to cut ingredients of the feed located in the interior of the tub into smaller pieces. The knife 40 may be mounted on the auger 20 so that the knife is moved in the interior of the tub by rotation of the auger for contacting the feed in the interior. Typically, the knife 40 has one or more forward edges 42 which are sharpened edges to facilitate the cutting of the ingredients. The forward edge 42 of the knife is a sharpened edge to facilitate the cutting function, and at least a portion of the forward edge tapers thinner in thickness to a thin thickness at the forwardmost extent of the forward edge. Typically, a plurality of the knives 40 are mounted on the flighting of the auger at a location spaced along the outer edge 32 of the flighting.

The system 1 may further include a bale ripper assembly 50 for pulling plant material from a bale of the plant material which is at least partially positioned in the interior 15 of the tub and contacted by elements of the ripper assembly 50. The bale ripper assembly 50 may be mounted on the auger, such as on the uppermost circumvolution 38 of the flighting 28. The bale ripper assembly 50 may be located on the flighting toward the upper end 30 of the flighting, and may be located in a position on the flighting closer to the upper end of the flighting than positions of any knives mounted on the flighting. In some implementations, the bale ripper assembly 50 may replace a conventional knife in the mounting position of the knife on the auger, and in some implementations, the bale ripper device may be employed in combination with a knife at the same mounting position on the auger. Positioning of the bale ripper assembly 50 toward the upper end 30 of the flighting and toward the upper tip 24 of the central mast of the auger facilitates contact between the bale ripper assembly 50 and a bale when the bale is initially placed or dropped into the interior 15 of the tub to pull plant material from the bale so that the plant material may drop further into the interior of the tub and be intermixed with any other ingredients in the interior as well as being acted upon by any knives mounted on the auger. Illustratively, the position of the bale ripper assembly 50 may be in the range of zero to approximately two feet along the outer edge of the flighting from the upper end of the flighting, and in some implementations may be approximately one foot from the upper end.

The bale ripper assembly 50 may include a bale ripper device 52 for contacting plant material in a bale, and in some embodiments, the ripper assembly 50 may also include a ripper support device 80 which supports the ripper device 52 on the auger when the bale ripper device is not directly mounted on the auger. In general, the bale ripper device 52 may be positioned so as to extend from the outer edge 32 of the flighting of the auger, and in some implementations (see, e.g., FIGS. 1 through 6) may be supported by the support device 80 in a spaced relationship to the outer edge 32 so as to extend the reach of the ripper device to an enhanced degree from the flighting to reach outwardly and in some embodiments upwardly from the flighting to engage the baled plant material. In other implementations, such as shown in FIGS. 7 through 14, the bale ripper device 52 may be more directly mounted on the flighting of the auger, and the ripper support device 80 may be omitted.

In illustrative embodiments, the bale ripper device 52 may have a first face 54 and a second face 56, with the first face being oriented upwardly and the second face being oriented downwardly when the device 52 is mounted on the auger for use. The bale ripper device 52 has a perimeter 58 which illustratively includes a leading perimeter portion 60 for orienting in a direction of movement of the device 52 when the device is mounted on the auger. The leading perimeter portion 60 of the perimeter 58 may provide the primary areas of contact between the ripper device and the plant material of a bale when the auger is rotated to move the device 52 in the interior of the tub. The perimeter 58 may also include a trailing perimeter portion 62 for orienting generally away from the direction of movement of the device 52 when the device is mounted on the auger such that the portion 62 may have only incidental contact with the baled plant material or other ingredients in the tub interior 15. The perimeter 58 may further include a base perimeter portion 64 for orienting in a direction toward the flighting of the auger, and may have limited, if any, direct contact with the baled plant material as a result of the rotation of the auger flighting.

In greater detail, the leading perimeter portion 60 of the perimeter 58 may include a plurality of sections, and the sections may be oriented at angles with respect to adjacent sections of the leading perimeter portion. In some embodiments, an outboard pair of sections 66, 67 may form an outboard tooth 70 of the bale ripper device, and further an inboard pair of the sections 68, 69 a form an inboard tooth 72 of the bale ripper device. In embodiments, the pair of sections forming each tooth may converge at an angle of approximately 60 degrees to approximately 120 degrees, and the angle may be in a range of approximately 80 degrees to approximately 100 degrees. Illustratively, the angle may measure approximately 90 degrees. The plurality of sections of the leading perimeter portion 60 may include an innermost section 74. The trailing perimeter portion 62 of the perimeter may have an arcuate shape in a plane encompassing the first face of the ripper device 52, and a notch section of the trailing perimeter portion may be located adjacent to the base perimeter portion 64 of the perimeter. In some embodiments, the trailing perimeter portion 62 of the perimeter may be generally arcuate in shape between the leading 60 and base 64 perimeter portions. The base perimeter portion 64 of the perimeter may be substantially straight between the leading 60 and trailing 62 perimeter portion portions, although other configurations may be useful. The innermost section of the leading perimeter portion may be oriented substantially perpendicular to the base perimeter portion.

Some highly preferred embodiments of the bale ripper device 52 have a uniform thickness between the first 54 and second 56 faces, and the uniform thickness may extend to the various portions and sections of the perimeter 58, particularly the leading perimeter portion. Illustratively, the ripper device 52 is formed of a plate of metal material. The bale ripper device has an edge face 75 which extends between the first and second faces, and may be blunt in character. The edge face 75 may extend in a plane that is oriented substantially perpendicular to one of the upper and lower faces, and may be perpendicular to both faces. The edge face 75 may have a width between the first and second faces that is substantially equal to the thickness of the plate forming the ripper device 52.

In some embodiments, such as those shown in FIGS. 7 through 14, the bale ripper device 52 includes a base portion 76 and a ripping portion 77. The base portion 76 of the ripper device 52 may be configured to engage and rip plant material from a bale, and the ripping portion 77 may be configured to be mounted on the flighting 28 of the auger. The ripping portion 77 may be abuttable or contactable against of one of the surfaces 34, 36 of the flighting, such as against the upper surface 34 of the flighting. The ripping portion 77 may have the leading 60 and trailing 62 perimeter portions of the perimeter 58, and the ripping portion may include the outboard tooth 70 and the inboard tooth 72. The base portion 76 may have a plurality of auger fastening apertures 78 for receiving fasteners to fasten the base portion to the flighting 28 of the auger. The auger fastening apertures 78 may be alignable with apertures in the flighting to receive the fasteners, and the apertures 78 may be elongated in shape to permit a degree of adjustable shifting of the position of the base portion with respect to the flighting of the auger while the fasteners are in position through the apertures.

The bale ripper device 52 has an upper side 79 which extends across the base 76 and ripping 77 portions, and in some embodiments the upper side 79 on the ripping portion 77 may be oriented at an oblique angle with respect to the upper side on the base portion 76. The angular relationship between the upper sides 79 of the base 76 and ripping 77 portions may be formed in any suitable manner, such as, for example, by bending a piece of plate material (often suitable for relatively smaller angles) or by attaching two pieces of plate material together at the desired angle by, for example, welding (often suitable for relatively larger angles). The oblique angle between the upper side of the ripping and base portions may measure from approximately 120 degrees to approximately 180 degrees, and may be between 120 degrees and 150 degrees. Illustratively, the angle may be approximately 135 degrees.

In some implementations, the bale ripper device 52 may be mountable on the flighting 28 of the auger in combination with a knife 40, as shown in FIGS. 7 through 11. The bale ripper device 52 and the knife 40 may have a stacked arrangement, and the knife may be positioned between the base portion 76 of the ripper device 52 and the flighting 28.

Embodiments employing the ripper support device 80 may utilize the support device to support the bale ripper device 52 on the auger, and may engage the flighting 28 of the auger. In some embodiments, the ripper support device 80 may engage the central mast 22 of the auger to provide enhanced support to the support device 80, as well as the ripper device 52. The ripper support device 80 may have a mounting portion 82 for mounting on the flighting 28 of the auger and a support portion 84 on which the bale ripper device 52 is mounted. The mounting portion 82 may be positionable against the flighting 28 when the support device 80 is mounted on the auger, and in some implementations the mounting portion is abutted against the lower surface 36 of the flighting when installed on the auger. The support portion 84 of the support device may be positionable against the bale ripper device, such as with the portion 84 being abutted against the second face 56 of the bale ripper device. Other relationships could be utilized, such as abutting the mounting portion 82 against the upper surface 34 of the flighting.

The ripper support device 80 has an upper side 86 which may extend across the mounting 82 and support 84 portions of the device 80. The section of the upper side 86 located on the support portion 84 may be oriented at an oblique angle with respect to the section of the upper side located on the mounting portion 82. The oblique angle between the sections of the upper side of the portions 82, 84 may measure from approximately 120 degrees to approximately 180 degrees, and may be between 120 degrees and 150 degrees. Illustratively, the angle may be approximately 135 degrees.

In some illustrative embodiments, the ripper support device 80 may comprise a primary support member 90 that forms the mounting portion 82 and the support portion 84 of the ripper support device. The primary support member 90 may be formed by a primary plate, and the primary plate may be bent along the line between the mounting and support portions to produce the oblique angle between the portions.

Various techniques may be utilized to attach the bale ripper assembly 50 on the flighting 28 of the auger 20, In some embodiments, fasteners, such as bolts and nuts, may be utilized to create the attachment, while other attachment techniques may also be used. In implementations that utilize fasteners, the primary support member 90 may have a plurality of fastening apertures formed therein to fasten the primary support member 90 to the flighting 28 of the auger and to fasten the ripper device 52 to the support member 90. Illustratively, the plurality of fastening apertures may include a first group 92, 94 of fastening apertures which are located on the mounting portion 82 of the ripper support device for receiving fasteners to fasten the primary support member 90 to the flighting 28 of the auger. The flighting may be provided with complementarily positioned apertures, and such apertures may have been utilized for attaching an upper most knife that has been removed. The plurality of fastening apertures may further include a second group 96, 98 of fastening apertures which are located on the support portion 84 of the ripper support device for receiving fasteners to fasten the bale ripper device on the support portion in a first position for the ripper device. The first position of the ripper device may be characterized by the ripper device being positioned in a configuration that is relatively more extended outwardly with respect to the flighting of the auger, The plurality of fastening apertures may include a third group 100, 102 of fastening apertures which are located on the support portion 84 of the ripper support device for receiving fasteners to fasten the bale ripper device on the support portion in a second position for the ripper device. The second position of the bale ripper device may be characterized by the ripper device being positioned in a configuration that is relatively more inward with respect to the flighting of the auger. Illustratively, the fastening apertures of the second and third groups may have similar configurations to fastening apertures formed in the bale ripper device such that the fastening apertures of the ripper device may be registered with the fastening apertures of either the second or the third group of fastening apertures on the primary support member. Thus, the ripper device 52 may be fastened to the support device in one of at least two configurations. Illustratively, the fastening apertures of the second group and the third group may each extend in a respective line, and the line of apertures of the third group may be angled with respect to the line of apertures of the second group, although other arrangements of the apertures may be utilized.

The ripper support device 80 may further comprise a secondary support member 110 which is configured to engage the central mast 22 of the auger to provide enhanced support for the support device 80 as well as the ripper device 52 mounted thereon. The secondary support member 110 may be abuttable against the peripheral surface 26 of the central mast. The secondary support member 110 may have an abutment surface 112 for contacting the peripheral surface 26 of the mast, and the abutment surface may be configured in a manner that is complementary to a portion of the peripheral surface 26, such as, for example, an arcuate shape to complement the substantially cylindrical peripheral surface. Illustratively, the secondary support member 110 may comprise a secondary plate. In some embodiments, the secondary support member 110 of the support device is not directly fastened to the central mast, but merely abuts the central mast, although direct fastening may be utilized. The ripper support device 80 may have at least one support strut 120 extending between the primary support member 90 and the secondary support member 110 to secure the primary and secondary support members together by the support strut 120 being mounted on the primary and secondary support members. Illustratively, a plurality of support struts 120, 122, 124 may be utilized to connect the support members.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. A bale ripper assembly for pulling plant material from a bale at least partially positioned in a tub of a feed mixer apparatus, the bale ripper assembly comprising:

a bale ripper device being supportable on a rotatable auger of the feed mixer apparatus, the bale ripper device having a first face and a second face, the bale ripper device having a perimeter, the perimeter including a leading perimeter portion for orienting in a direction of movement of the device when the device is mounted on the auger and the auger is rotating, the leading perimeter portion of the perimeter including a plurality of sections, each section of the plurality of sections being oriented at an angle with respect to an adjacent said section of the leading perimeter portion, an outboard pair of said sections forming an outboard tooth of the bale ripper device;

wherein each section of the leading perimeter portion of the perimeter has an edge face extending between the first and second faces, an entirety of each of the edge faces between the first and second faces extending in a plane oriented substantially perpendicular to one of the first and second faces of the bale ripper device;

wherein an inboard pair of said sections of the leading perimeter portion of the perimeter form an inboard tooth of the bale ripper device;

wherein the bale ripper device includes:

a ripping portion having the inboard and outboard teeth to engage and rip plant material from a bale; and a base portion for positioning against one of the surfaces of the flighting of the auger to mount the ripper device on the flighting of the auger of the feed mixer apparatus; and wherein the ripping portion of the bale ripper device has the leading perimeter portion and a trailing perimeter edge of the perimeter.

2. The assembly of claim 1 wherein the edge face of the leading perimeter portion of the perimeter of the bale ripper device extends in a plane oriented substantially perpendicular to the upper face of the bale ripper device.

3. The assembly of claim 1 wherein the edge face has a width between the first and second faces substantially equal to a thickness of a plate forming the bale ripper device.

4. The assembly of claim 1 additionally comprising a ripper support device on which the bale ripper device is mounted, the ripper support device being configured to support the bale ripper device on the auger in a spaced relationship from the auger of the feed mixer apparatus.

5. The assembly of claim 4 wherein the ripper support device has a mounting portion for mounting on flighting of the auger and a support portion for mounting the bale ripper device on, the mounting portion being positionable against the flighting of the auger, the support portion being positionable against the bale ripper device.

6. The assembly of claim 5 wherein the ripper support device has an upper side extending across the mounting and support portions, the upper side on the support portion being oriented at an oblique angle with respect to the upper side on the mounting portion to support the ripper device at the oblique angle with respect to flighting of the auger.

7. The assembly of claim 5 wherein the ripper support device comprises a primary support member forming the mounting portion and support portion of the ripper support device, the primary support member having a plurality of fastening apertures formed therein, the plurality of fastening apertures being configured to support the bale ripper device in at least two different positions on the flighting of the auger.

8. The assembly of claim 7 wherein the plurality of fastening apertures include:

a first group of fastening apertures located on the mounting portion of the ripper support device for receiving fasteners fastening the primary support member to the flighting of the auger;

a second group of fastening apertures located on the support portion of the ripper support device for receiving fasteners fastening the bale ripper device on the support portion in a first position;

a third group of fastening apertures located on the support portion of the ripper support device for receiving fasteners fastening the bale ripper device on the support portion in a second position; and wherein the first position is characterized by the bale ripper device being positioned relatively further outward with respect to the flighting of the auger, the second position being characterized by the bale ripper device being positioned relatively closer with respect to the flighting of the auger.

9. A bale ripper assembly for pulling plant material from a bale at least partially positioned in a tub of a feed mixer apparatus, the bale ripper assembly comprising:

a bale ripper device being supportable on a rotatable auger of the feed mixer apparatus, the bale ripper device having a first face and a second face, the bale ripper device having a perimeter, the perimeter including a leading perimeter portion for orienting in a direction of movement of the device when the device is mounted on the auger and the auger is rotating, the leading perimeter portion of the perimeter including a plurality of sections, each section of the plurality of sections being oriented at an angle with respect to an adjacent said section of the leading perimeter portion, an outboard pair of said sections forming an outboard tooth of the bale ripper device;

a ripper support device on which the bale ripper device is mounted, the ripper support device being configured to support the bale ripper device on the auger in a spaced relationship from the auger of the feed mixer apparatus;

wherein the leading perimeter portion of the perimeter has an edge face extending between the first and second faces, the edge face extending in a plane oriented substantially perpendicular to one of the first and second faces of the bale ripper device; and wherein the ripper support device is configured to engage flighting of the auger and engage a central mast of the auger.

10. A bale ripper assembly for pulling plant material from a bale at least partially positioned in a tub of a feed mixer apparatus, the bale ripper assembly comprising:

a bale ripper device being supportable on a rotatable auger of the feed mixer apparatus, the bale ripper device having a first face and a second face, the bale ripper device having a perimeter, the perimeter including a leading perimeter portion for orienting in a direction of movement of the device when the device is mounted on the auger and the auger is rotating, the leading perimeter portion of the perimeter including a plurality of sections, each section of the plurality of sections being oriented at an angle with respect to an adjacent said section of the leading perimeter portion, an outboard pair of said sections forming an outboard tooth of the bale ripper device;

wherein the leading perimeter portion of the perimeter has an edge face extending between the first and second faces, the edge face extending in a plane oriented substantially perpendicular to one of the first and second faces of the bale ripper device, a ripper support device on which the bale ripper device is mounted, the ripper support device being configured to support the bale ripper device on the auger in a spaced relationship from the auger of the feed mixer apparatus;

wherein the ripper support device has a mounting portion for mounting on flighting of the auger and a support portion for mounting the bale ripper device on, the mounting portion being positionable against the flighting of the auger, the support portion being positionable against the bale ripper device;

wherein the ripper support device comprises a primary support member forming the mounting portion and support portion of the ripper support device, the primary support member having a plurality of fastening apertures formed therein, the plurality of fastening apertures being configured to support the bale ripper device in at least two different positions on the flighting of the auger;

wherein the ripper support device additionally comprises a secondary support member configured to engage the central mast of the auger; and at least one support strut extending between the primary support member and the secondary support member to support the secondary support member on the primary support member.

11. A bale ripper assembly for pulling plant material from a bale at least partially positioned in a tub of a feed mixer apparatus, the bale ripper assembly comprising:

a bale ripper device being supportable on a rotatable auger of the feed mixer apparatus, the bale ripper device having a first face and a second face, the bale ripper device having a perimeter, the perimeter including a leading perimeter portion for orienting in a direction of movement of the device when the device is mounted on the auger and the auger is rotating, the leading perimeter portion of the perimeter including a plurality of sections, each section of the plurality of sections being oriented at an angle with respect to an adjacent said section of the leading perimeter portion, an outboard pair of said sections forming an outboard tooth of the bale ripper device;

wherein the leading perimeter portion of the perimeter has an edge face extending between the first and second faces, the edge face extending in a plane oriented substantially perpendicular to one of the first and second faces of the bale ripper device;

wherein an inboard pair of said sections of the section of the leading perimeter portion of the perimeter form an inboard tooth of the bale ripper device; and wherein the bale ripper device includes:
a ripping portion having the inboard and outboard teeth to engage and rip plant material from a bale; and
a base portion for positioning against one of the surfaces of the flighting of the auger to mount the ripper device on the flighting of the auger of the feed mixer apparatus;

wherein the bale ripper device has an upper side extending across the base and ripping portions, the upper side on the ripping portion being oriented at an oblique angle with respect to the upper side on the base portion.

12. A system comprising:
an agricultural feed mixer apparatus configured to mix ingredients for animal feed including a fibrous plant material bound in a bale, the mixer apparatus comprising:
a frame;
a tub mounted on the frame and defining an interior for holding the ingredients of the feed to be mixed, the tub having a lower floor and an upper opening;
an auger positioned in the interior of the tub, the auger extending upwardly in the interior, the auger comprising a central mast rotatably mounted on the frame and extending upwardly in the interior of the tub and flighting mounted on the central mast to rotate with the mast, the flighting having a helical configuration extending about the central mast, the flighting having an upper end toward the upper opening of the tub and a lower end toward the floor of the tub, the flighting having an outer edge, the flighting having an uppermost circumvolution extending from the upper end of the flighting;
at least one knife configured to cut ingredients of the feed located in the interior of the tub, the at least one knife being mounted on the flighting of the auger to be moved in the interior of the tub by rotation of the auger for contacting the feed in the interior, the at least one knife having a forward edge with a sharpened edge; and a bale ripper assembly for pulling plant material from a bale at least partially positioned in the tub of the feed mixer apparatus, the bale ripper assembly comprising a bale ripper device supported on the uppermost circumvolution of the auger, the bale ripper device having a first face and a second face, the bale ripper device having a perimeter, the perimeter including a leading perimeter portion for orienting in a direction of movement of the device when the auger is rotated for mixing, the leading perimeter portion of the perimeter including a plurality of sections, each section of the plurality of sections being oriented at an angle with respect to an adjacent said section of the leading perimeter portion, an outboard pair of said sections forming an outboard tooth of the bale ripper device;

wherein the leading perimeter portion of the perimeter has an edge face extending between the first and second faces, an entirety of the edge face between the first and second faces extending in a plane oriented substantially perpendicular to each of the first and second faces of the bale ripper device;

wherein the bale ripper assembly additionally comprises a ripper support device mounted on the flighting of the auger and having the bale ripper device mounted thereon such that the support device supports the bale ripper device on the auger in a spaced relationship from the auger of the feed mixer apparatus; and wherein the ripper support device engages the central mast of the auger to provide additional support to the bale ripper assembly.

13. The system of claim 12 wherein the bale ripper device and the knife are mounted on the flighting of the auger in combination on the flighting at a same position along the along the outer edge of the flighting.

14. The system of claim 12 wherein the edge face of the leading perimeter portion of the perimeter of the bale ripper device extends in a plane oriented substantially perpendicular to the upper face of the bale ripper device.

15. The system of claim 12 wherein the ripper support device has a mounting portion and a support portion, the mounting portion being mounted on the flighting of the auger, the bale ripper device being mounted on the support portion.

16. The system of claim 12 wherein an inboard pair of said sections of the section of the leading perimeter portion of the perimeter form an inboard tooth of the bale ripper device; and wherein the bale ripper device of the bale ripper assembly includes:
a ripping portion having the inboard tooth and the outboard tooth to engage and rip plant material from a bale; and
a base portion mounted on the flighting of the auger to mount the ripper device on the flighting of the auger of the feed mixer apparatus.

17. The system of claim 12 wherein the bale ripper assembly has a plurality of fastening apertures formed therein, the plurality of fastening apertures supporting the bale ripper device in one of at least two different positions on the flighting of the auger.

18. A bale ripper assembly for pulling plant material from a bale at least partially positioned in a tub of a feed mixer apparatus, the bale ripper assembly comprising:

a bale ripper device being supportable on a rotatable auger of the feed mixer apparatus, the bale ripper device having a first face and a second face, the bale ripper device having a perimeter, the perimeter including a leading perimeter portion for orienting in a direction of movement of the device when the device is mounted on the auger and the auger is rotating, the leading perimeter portion of the perimeter including a plurality of sections, each section of the plurality of sections being oriented at an angle with respect to an adjacent said section of the leading perimeter portion, an outboard pair of said sections forming an outboard tooth of the bale ripper device;

wherein the leading perimeter portion of the perimeter has an edge face extending between the first and second faces, the edge face extending in a plane oriented substantially perpendicular to one of the first and second faces of the bale ripper device;

wherein the bale ripper device includes:
- a ripping portion having the outboard tooth to engage and rip plant material from a bale; and
- a base portion for positioning against one of the surfaces of the flighting of the auger to mount the ripper device on the flighting of the auger of the feed mixer apparatus;
- wherein the ripping portion of the bale ripper device has the leading perimeter portion and a trailing perimeter edge of the perimeter.

* * * * *